United States Patent
Majkowska et al.

(10) Patent No.: US 12,210,564 B2
(45) Date of Patent: Jan. 28, 2025

(54) QUERY CATEGORIZATION BASED ON IMAGE RESULTS

(71) Applicant: Google LLC, Mountain View, CA (US)

(72) Inventors: Anna Majkowska, San Francisco, CA (US); Cristian Tapus, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/454,884

(22) Filed: Aug. 24, 2023

(65) Prior Publication Data

US 2023/0401251 A1  Dec. 14, 2023

Related U.S. Application Data (63) Continuation of application No. 17/705,478, filed on Mar. 28, 2022, now Pat. No. 11,782,970, which is a continuation of application No. 15/803,215, filed on Nov. 3, 2017, now Pat. No. 11,308,149, which is a continuation of application No. 12/649,160, filed on Dec. 29, 2009, now Pat. No. 9,836,482.

(51) Int. Cl.
  *G06F 16/53*  (2019.01)
  *G06F 16/532*  (2019.01)
  *G06N 20/00*  (2019.01)

(52) U.S. Cl.
  CPC ........... *G06F 16/532* (2019.01); *G06N 20/00* (2019.01)

(58) Field of Classification Search
  CPC ........ G06F 16/532; G06F 16/50; G06N 20/00
  See application file for complete search history.

(56) References Cited

U.S. PATENT DOCUMENTS

| | | | |
|---|---|---|---|
| 6,917,965 B2 | 7/2005 | Gupta et al. | |
| 7,627,556 B2 | 12/2009 | Liu | |
| 8,010,537 B2 | 8/2011 | Kantamneni et al. | |
| 8,165,408 B2 | 4/2012 | Fukaya et al. | |
| 8,180,667 B1 | 5/2012 | Baluja et al. | |
| 8,340,405 B2 | 12/2012 | Cooper et al. | |
| 8,356,245 B2 | 1/2013 | Doganata | |
| 2004/0260929 A1* | 12/2004 | Albornoz | G06F 16/907 707/E17.143 |
| 2006/0064411 A1* | 3/2006 | Gross | G06F 16/9535 |

(Continued)

OTHER PUBLICATIONS

Tao et al., "Which Components are Important for Interactive Image Searching?" Transactions on Circuits and Systems for Video Technology, vol. 18, No. 1, Jan. 2008, 9 pages.

(Continued)

*Primary Examiner* — Hosain T Alam
*Assistant Examiner* — Cecile H Vo
(74) *Attorney, Agent, or Firm* — DORITY & MANNING P.A.

(57) ABSTRACT

Methods, systems, and apparatus, including computer programs encoded on a computer storage medium, for query categorization based on image results. In one aspect, a method includes receiving images from image results responsive to a query, wherein each of the images is associated with an order in the image results and respective user behavior data for the image as a search result for the first query, and associating one or more of the first images with a plurality of annotations based on analysis of the selected first images' content.

20 Claims, 6 Drawing Sheets

(56) References Cited

U.S. PATENT DOCUMENTS

| | | | |
|---|---|---|---|
| 2006/0224587 A1* | 10/2006 | Zamir | G06F 16/24534 |
| 2009/0063455 A1 | 5/2009 | Li et al. | |
| 2009/0313239 A1* | 12/2009 | Wen | G06F 16/5838 |
| | | | 707/999.005 |
| 2010/0094854 A1* | 4/2010 | Rouhani-Kalleh | ......................... |
| | | | G06F 16/3325 |
| | | | 707/706 |
| 2010/0293174 A1* | 11/2010 | Bennett | G06F 16/353 |
| | | | 707/769 |
| 2011/0173141 A1 | 7/2011 | Campbell et al. | |
| 2011/0191211 A1* | 8/2011 | Lin | G06F 16/5846 |
| | | | 707/706 |

OTHER PUBLICATIONS

Viola et al., "Rapid Object Detection Using a Boosted Cascade of Simple Features", Electric Research Laboratories, Inc., 2004, 11 pages.

\* cited by examiner

QUERY CATEGORIZATION BASED ON IMAGE RESULTS

CROSS-REFERENCE TO RELATED APPLICATIONS

This application is a continuation application of, and claims priority to, U.S. patent application Ser. No. 17/705,478, titled "Query Categorization Based on Image Results," filed on Mar. 28, 2022, which is a continuation application of, and claims priority to, U.S. patent application Ser. No. 15/803,215, titled "Query Categorization Based on Image Results," filed on Nov. 3, 2017, which is a continuation application of, and claims priority to, U.S. patent application Ser. No. 12/649,160, titled "Query Categorization Based on Image Results," filed on Dec. 29, 2009. The disclosure of the foregoing applications are incorporated herein by reference in its entirety for all purposes.

BACKGROUND

Internet search engines provide information about Internet accessible resources (e.g., Web pages, images, text documents, multimedia content) that are responsive to a user's search query by returning, in the case of image searching, a set of image search results in response to the query. A search result includes, for example, a Uniform Resource Locator (URL) of an image or of a document containing the image, and a snippet of information. The search results can be ranked (e.g., in an order) according to scores assigned to them by a scoring function. The scoring function ranks the search results according to various signals, for example, where (and how often) query text appears in document text surrounding an image, an image caption, or in alternative text for the image, and how common the query terms are in the search results indexed by the search engine.

SUMMARY

In general, one aspect of the subject matter described in this specification can be embodied in a method that includes obtaining images from first image results responsive to a first query, wherein a plurality of the obtained images are associated with scores and user behavior data that indicates user interaction with the obtained images when the obtained images were presented as search results for the query; selecting a plurality of the obtained images each having respective behavior data that satisfies a threshold; and associating the selected first images with a plurality of annotations based on analysis of the selected images' content. Other embodiments of this aspect include corresponding systems, apparatus, and computer program products.

These and other aspects can optionally include one or more of the following features. The first query can be associated with one or more categories based on the annotations. The category and annotation associations can be stored for future use. Second image results responsive to a second query that is the same or similar to the first query can be received and wherein each of the second images is associated with a score; and one or more of the second images can be modified based on the categories associated with the first query. One of the categories can indicate that the first query is a single person query, and increasing the scores of one or more of the second images whose annotations indicate that the set of second images contain a single face. One of the categories can indicate that the first query is a diverse query, and increasing the scores of one or more of the second images whose annotations indicate that the set of second images are diverse. One of the categories can indicate that the first query is a text query, and increasing the scores of one or more of the second images whose annotations indicate that the set of second images contain text. The first query can be provided to a trained classifier to determine a category in the categories. Analysis of the selected first images' content can include clustering the selected first image results to determine an annotation in the annotations. User behavior data can be a number of times users select the image in search results for the first query.

Particular embodiments of the subject matter described in this specification can be implemented so as to realize one or more of the following advantages. The image result set is analyzed in order to derive image annotations and query categories. User interaction with image search results can be used to derive categories for queries. Query categories can, in turn, improve the relevance, quality and diversity of image search results. Query categorization can also be used as part of query processing or in an off-line process. Query categories can be used to provide automated query suggestions such as, "show only images with faces," or "show only clip art."

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. IA illustrates an example system that uses query categorization to improve the set of results returned for a query.

FIG. IB illustrates an example query categorizor engine.

Like reference numbers and designations in the various drawings indicate like elements.

DETAILED DESCRIPTION

Figure 1A:
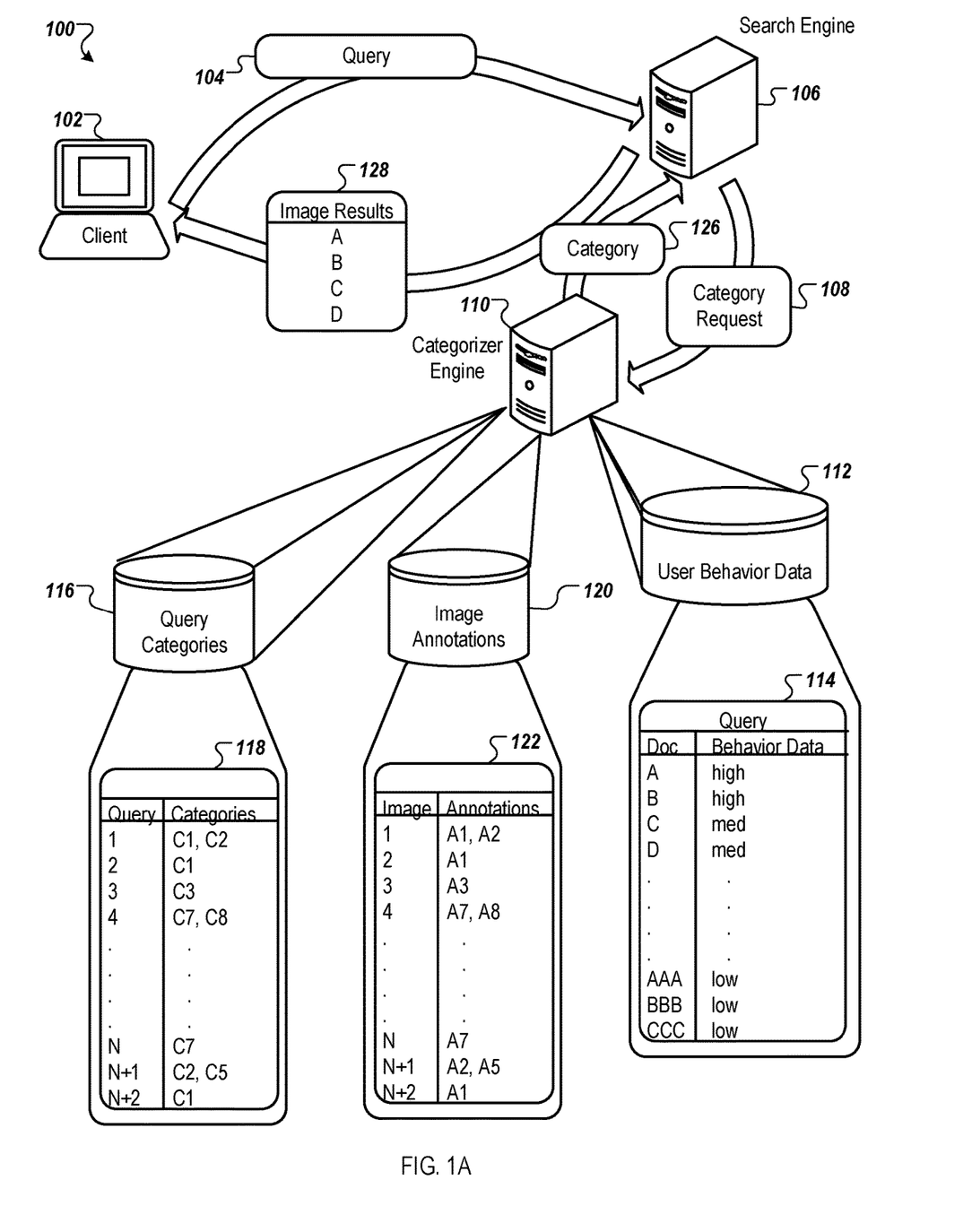

FIG. IA illustrates an example system 100 that uses query categorization to improve the set of results returned for a query. In various implementations, a client 102, such as a web browser or other process executing on a computing device, submits an input query 104 to a search engine 106, and the search engine 106 returns image search results 128 to the client 102. In some implementations, a query comprises text such as one or more characters in a character set (e.g., "red tomato"). In other implementations, a query comprises one or more images, sounds, videos, or combinations of these. Other query types are possible. In some implementations, the search engine 106 searches for results based on one or more alternate versions of the query that are equivalent to, conceptually broader than, or conceptually more specific than the input query 104.

The image search results 128 are an ordered or ranked list of documents, or links to such, determined to be responsive to the input query 104, with the documents determined to be most relevant having the highest rank. A document is web page, an image, or other electronic file, for example. In the case of image search, the search engine 106 determines an image's relevance based, at least in part, on the image's content, text surrounding the image, an image caption, or in alternative text for the image, for example. In producing the image search results 128, the search engine 106 in some implementations submits a request 108 for categories associated with the query 104. The search engine 106 can use the associated categories 126 to re-order the image search results 128 by, for example, increasing the rank of image results that are determined to belong to the associated categories and, in some cases, decreasing the rank of image results that are determined not belong to the associated categories, or both. The search engine 106 can also use the categories of the results to determine how they should be ranked in the finalized set of results 128 in combination with or independently of the query category.

To derive categories for the query 104, a categorizer engine 110 or other process employs image results 128 retrieved for the query and (optionally) a user behavior data repository 112. The repository 112 stores user behavior data. In some implementations, repository 112 indicates the number of times one or more populations of users selected an image result for a given query. Image selection can be accomplished in a variety of ways including selection using the keyboard, a computer mouse or a finger gesture, a voice command, or other ways. In other implementations, user behavior data includes "click data". Click data indicates how long a user views or "dwells" on an image result after selecting it in a results list for the query. For example, a longer time spent dwelling on an image (e.g., greater than 1 minute), termed a "long click", can indicate that a user found the image to be relevant for the user's query. A brief period viewing an image (e.g., less than 30 seconds), termed a "short click", can be interpreted as a lack of image relevance. Other types of user behavior data are possible.

By way of illustration, user behavior data can be generated by a process that creates a record for result documents that are selected by users in response to a specific query. Each record can be represented as a tuple: <document, query, data>) that includes a query submitted by users or a query reference indicating the query, a document reference indicating a document selected by users in response to the query, and an aggregation of click data (e.g., a count of each click type) for all users or a subset of all users that selected the document reference in response to the query. In some implementations, extensions of this tuple-based approach to user behavior data are possible. For instance, the user behavior data can be extended to include location-specific (e.g., country or state) or language-specific identifier. With such identifiers included, a country-specific tuple would include the country from where the user query originated from and a language-specific tuple would include the language of the user query.

For simplicity of presentation, the user behavior data associated with documents A-CCC for the query 104 is depicted in a table 114 as being either a "high," "med," or "low" amount of favorable user behavior data (e.g., user behavior data indicating relevance between the document and the query 104). Favorable user behavior data for a document can indicate that the document is frequently selected by users when it is viewed in the results for the query 104, or when a users view the document after selecting it from the results for the query 104, the users view the document for a relatively long period of time (e.g., the user finds the document to be relevant to the query 104). The categorizer engine 110 works in conjunction with the search engine 106 using returned results and optionally user behavior data to determine query categories and then re-rank the results before they are returned to the user.

In general, for the query (e.g., query 104 or an alternate form of the query 104) specified in the query category request 108, the categorizer engine 110 analyzes image results for the query in order to determine if the query belongs to one or more categories. Image results that are analyzed in some implementations are those that have been selected by users as a search result for the query a total number of times that is above a threshold (e.g., selected at least ten times). In other implementations, the categorizer engine 110 analyzes all image results retrieved by the search engine for a given query. In further implementations, the categorizer engine 110 analyzes image results for the query where a metric (e.g., the total number of selections or other measure) for the click data is above a threshold. The image results can be analyzed using computer vision techniques in a variety of ways, either off-line or on-line during the scoring process. Images are then annotated with information extracted from their visual content. For example, image annotations can be stored in annotation store 120. Each analyzed image (e.g., image 1, image 2, and so on) is associated with one or more annotations (e.g., A1, A2, and so on) in an image to annotation association 122. The annotations can include, for example: a number of faces in the image, a size of each face, dominant colors of the image, whether an image contains text or a graph, and whether an image is a screen-shot. Additionally, each image can be annotated with a fingerprint which can be then used to determine if two images are identical or nearly identical.

Next, the categorizer engine 110 analyzes image results for a given query together with their annotations in order to determine query categories 116. Associations 118 of query categories (e.g., C1, C2, and so on) for a given query (e.g., query 1, query 2, and so on) can be determined in many ways, such as using a simple heuristic or using an automated classifier. As an example, a simple query categorizer based on a heuristic can be used determine the desired dominant color for the query (and whether there is one). The heuristic can be, for example, that if out of the top 20 most often clicked images for the query, at least 70% have a dominant color red (based on the image annotations 120), then the query can be categorized as "red query". For such queries, the search engine can re-order the retrieved results to increase the rank of all images that are annotated with red as a dominant color. The same categorization can be used with all other common colors. An advantage of this approach over analyzing the text of the query, is that it works for all languages without the need for translation (e.g., it will promote images with dominant red color for query "red apple" in any language) and is more robust (e.g., it will not increase the rank of red images for query "red sea").

Figure 1B:
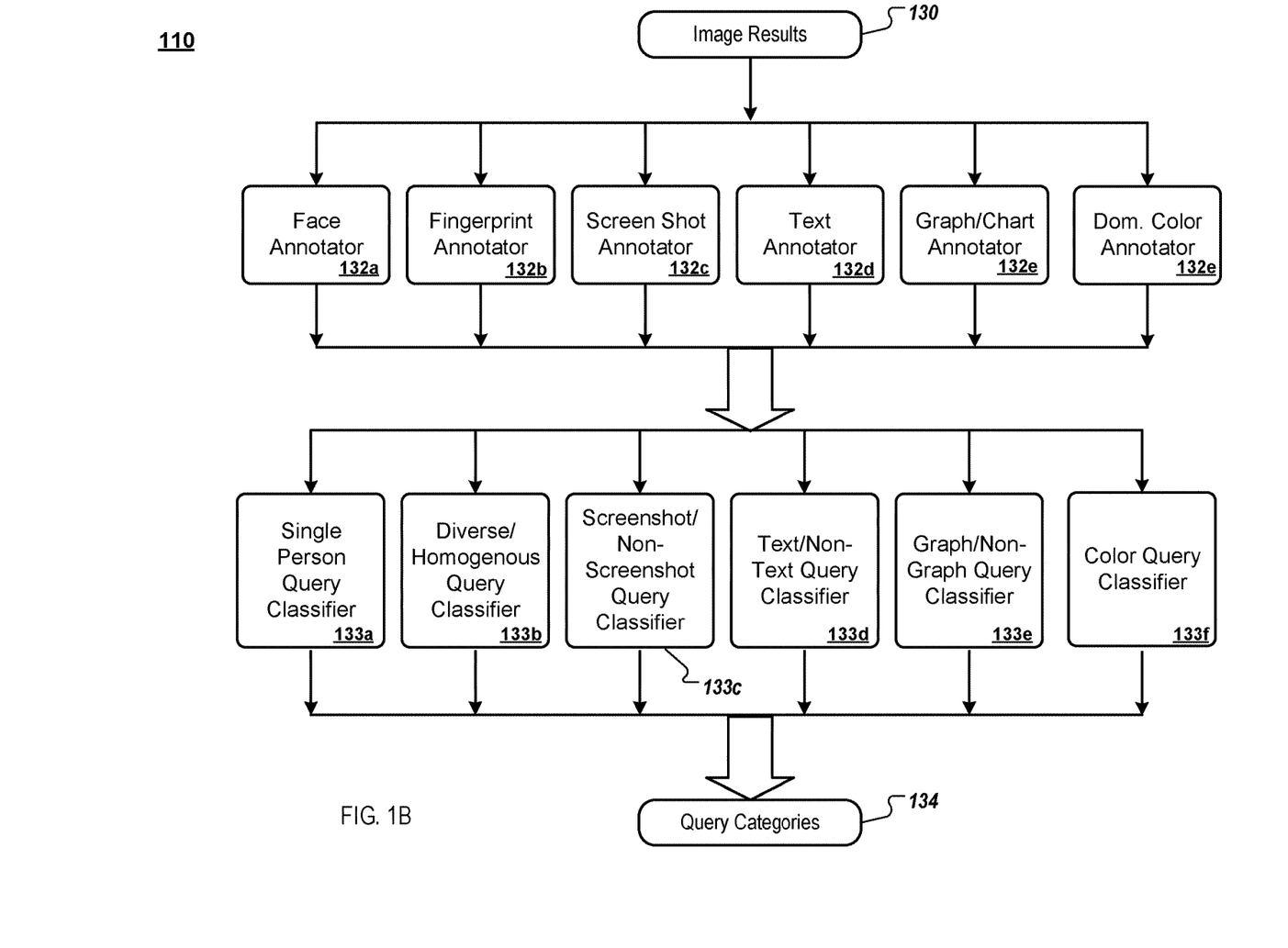

FIG. 1B illustrates an example categorizer engine 110. The categorizer engine 110 can work in an on-line mode (as shown in FIG. IA) or in an off-line mode in which query category associations are stored ahead of time (e.g., in table 118) for use by the search engine 106 during query processing. The engine 110 receives query image results 130 for a given query, and provides the image results 130 to one or more image annotators 132a-e. Each image annotator analyzes image results and extracts information about the visual content of the image, which is then stored as an image annotation (e.g., image annotations 120) for the image. By way of illustration, a face image annotator 132a determines how many faces are in an image and the size of each face, a fingerprint image annotator 132b extracts image visual features in a condensed form (fingerprint) which then can be compared with the fingerprint of another image to determine if the two images are similar, a screenshot image annotator 132c determines if an image is a screenshot, a text image annotator 132d determines if an image contains text, a graph/chart image annotator 132e determines if an image contains graphs or charts (e.g., bar graphs), and a dominate color annotator 132e determines if an image contains a dominant color. Other image annotators can also be used. For example, several image annotators are described in a paper entitled "Rapid Object Detection Using a Boosted Cascade of Simple Features," by Viola, P.; Jones, M., Mitsubishi Electric Research Laboratories, TR2004-043 (May 2004).

Next, the categorizer engine 110 analyzes image results for a given query together with their annotations to determine query categories (e.g., query categories 116). In some implementations, query categories are determined using a classifier. A query classifier can be realized with a machine learning system. By way of illustration, AdaBoost, short for Adaptive Boosting, is a machine learning system that can be used in conjunction with other learning algorithms to improve their performance. AdaBoost is used to generate a query classifier. (Additional learning algorithms are possible, however.) AdaBoost invokes a "weak" image annotator repeatedly in a series of rounds. By way of illustration, the single person query classifier 133a can be based on a learning machine algorithm that has been trained to determine whether a query calls for images of a single person or not. By way of illustration, such a query classifier can be trained with data sets comprising a query, a set of feature vectors representing result images for the query that have zero or more faces, and the correct categorization for the query (i.e., faces or not). For each call the query classifier updates a distribution of weights that indicates the importance of examples in the training data set for the classification. On each round, the weights of each incorrectly classified training example are increased (or alternatively, the weights of each correctly classified training example are decreased), so that the new query classifier focuses more on those examples. The resulting trained query classifier 133a is able to take as input a query and output a probability that the query calls for images containing single persons.

A diverse/homogeneous query classifier 133b takes as input a query and outputs a probability that the query is for an image that is diverse. In some implementations, the classifier 133b uses a clustering algorithm to cluster image results 130 according to their fingerprints based on a measure of distance from each other. Each image is associated with a cluster identifier. The image cluster identifier is used to determine the number of clusters, the size of the clusters and the similarity between clusters formed by images in the result set. This information is used to associate a probability that the query is specific (or inviting duplicates) or not, for example. The classifier 133b can also be used to associate queries with canonical meanings and representations. For example, if there is a single large cluster, or several large clusters, then the probability that the query is associated with duplicate image results is high. If there are many, smaller clusters, then the probability that the query is associated with duplicate image results is low. Duplicates of images are usually not very useful as they provide no additional information, so they should be demoted as query results. However, there are exceptions. For example, if there are many duplicates in initial results (a few, large clusters), this indicates that the query is very specific and duplicates should not be demoted, for example.

A screenshot/non-screenshot query classifier 133c takes as input a query and outputs a probability that the query calls for images that are screenshots. A text/non-text query classifier 133d takes as input a query and outputs a probability that the query calls for images that contain text. A graph/non-graph query classifier 133e takes an input a query and outputs a probability that the query calls for images that contain a graph or a chart. A color query classifier 133f takes an input a query and outputs a probability that the query calls images that are dominated by a single color. Other query classifiers are possible.

Figure 2:
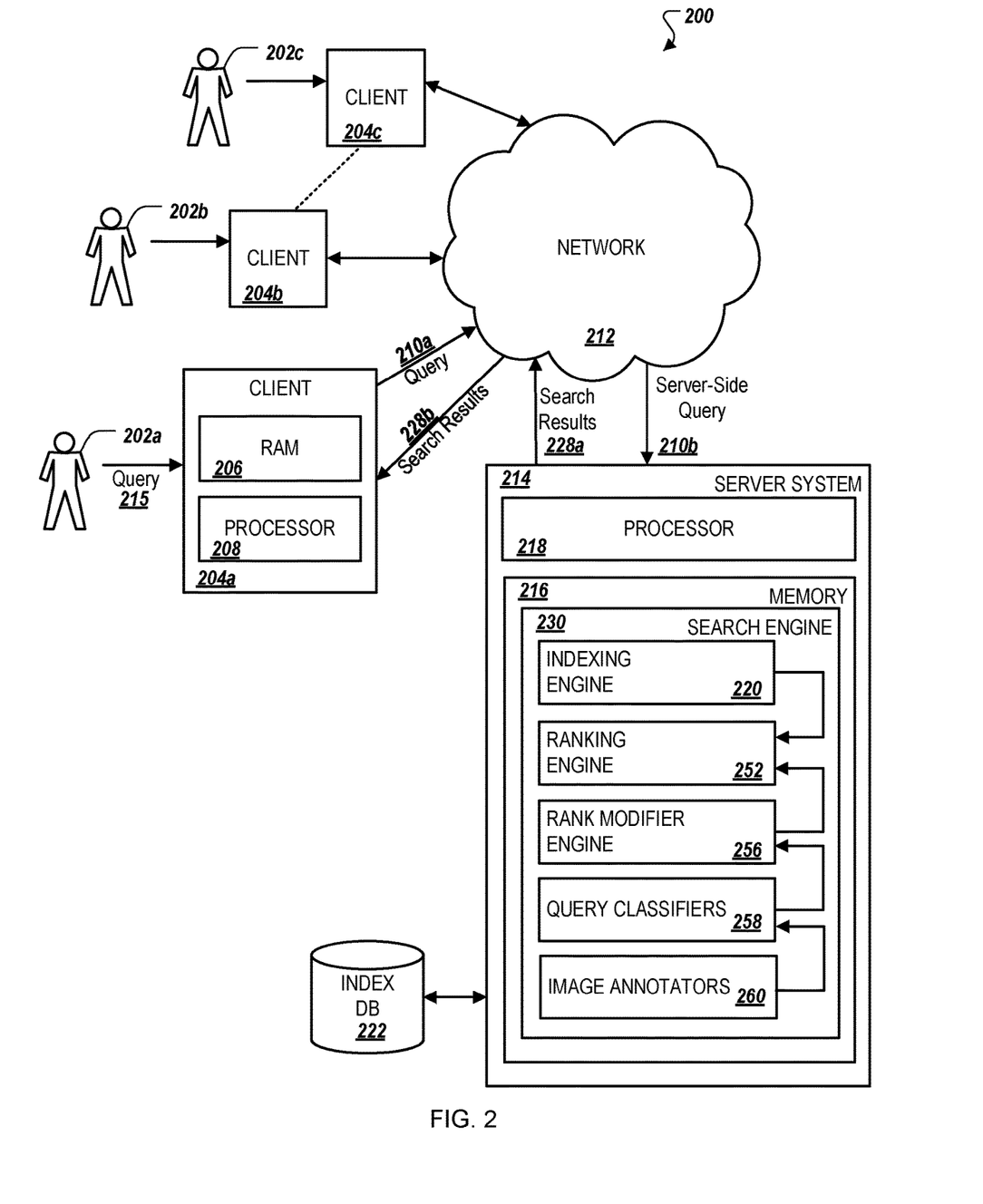
FIG. 2 is an example system for improving search results based on query categories.

FIG. 2 shows an example system 200 for improving the relevance of image results based on query categories. A user 202 (202a, 202b, 202c) can interact with the system 200 through a client device 204 (204a, 204b, 204c) or other device. For example, the client device 204 can be a computer terminal within a local area network (LAN) or wide area network (WAN). In another example, the client device 204 can be a mobile device (e.g., a mobile phone, a mobile computer, a personal desktop assistant, etc.) that is capable of communicating over a LAN, a WAN, or some other network (e.g., a cellular phone network). The client device 204 can include a random access memory (RAM) 206 (or other memory and/or a storage device) and a processor 208. The processor 208 is structured to process instructions and data within the system 200. In some implementations, the processor 208 is a single-threaded or multi-threaded microprocessor having one or more processing cores. The processor 208 is structured to execute instructions stored in the RAM 206 (or other memory and/or a storage device included with the client device 204) to render graphical information for a user interface.

A user 202a can connect to the search engine 230 within a server system 214 to submit an input query 215. In some implementations, the search engine 214 is an image search engine or a generic search engine which can retrieve images and other types of content such as documents (e.g., HTML pages). When the user 202a submits the input query 215 through an input device attached to a client device 204a, a client-side query 210a is sent into a network 212 and is forwarded to the server system 214 as a server-side query 210b. Server system 214 can be one or more server devices in one or more locations. A server device 214 includes a memory device 216, which can include the search engine 230 loaded therein. A processor 218 is structured to process instructions within the device 214. These instructions can implement one or more components of the search engine 230. The processor 218 can be a single-threaded processor or a multi-threaded processor, and can include multiple processing cores. The processor 218 can process instructions stored in the memory 216 related to the search engine 230 and can send information to the client device 204, through the network 212, to create a graphical presentation in a user interface of the client device 204 (e.g., a search results web page displayed in a web browser).

The server-side query 210b is received by the search engine 230. The search engine 230 uses the information within the input query 215 (e.g. query terms) to find relevant documents. The search engine 230 can include an indexing engine 220 that actively searches a corpus (e.g., web pages on the Internet) to index the documents found in that corpus, and the index information for the documents in the corpus can be stored in an index database 222. This index database 222 can be accessed to identify documents related to the user query 215. Note that, an electronic document (which for brevity will simply be referred to as a document) does not necessarily correspond to a file. A document can be stored in a portion of a file that holds other documents, in a single file dedicated to the document in question, or in multiple coordinated files. Moreover, a document can be stored in a memory without having first been stored in a file.

The search engine 230 can include a ranking engine 252 to rank the documents related to the input query 215. The ranking of the documents can be performed using traditional techniques for determining an Information Retrieval (IR) score for indexed documents in view of a given query. The relevance of a particular document with respect to a particular search term or to other provided information may be determined by any appropriate technique. For example, the general level of back-links to a document that contains matches for a search term may be used to infer a document's relevance. In particular, if a document is linked to (e.g., is the target of a hyperlink) by many other relevant documents (e.g., documents that also contain matches for the search terms), it can be inferred that the target document is particularly relevant. This inference can be made because the authors of the pointing documents presumably point, for the most part, to other documents that are relevant to their audience.

If the pointing documents are in turn the targets of links from other relevant documents, they can be considered more relevant, and the first document can be considered particularly relevant because it is the target of relevant (or even highly relevant) documents. Such a technique may be the determinant of a document's relevance or one of multiple determinants. Appropriate techniques can also be taken to identify and eliminate attempts to cast false votes so as to artificially drive up the relevance of a page.

To further improve such traditional document ranking techniques, the ranking engine 252 can receive an additional signal from a rank modifier engine 256 to assist in determining an appropriate ranking for the documents. The rank modifier engine 256, in conjunction with image annotators 260 and query classifiers 258 as described above, provides one or more measures of relevance for the documents, which can be used by the ranking engine 252 to improve the search results' ranking provided to the user 202. The rank modifier engine 256 can perform operations to generate the one or more measures of relevance. In some implementations, whether an image result's score is increased or decreased depends on whether the image's visual content (as represented in image annotations) matches the query's category. In some implementations, each image category is considered separately. For example, if the query's category is "single person", then an image result that is classified both as a "screenshot" and "single face" would first have its score decreased because of the "screenshot" category, and then have its score increased because of the "single face" category. The search engine 230 can forward the final, ranked result list within a server-side search results 228a through the network 212. Exiting the network 212, a client-side search results 228b can be received by the client device 204a where the results can be stored within the RAM 206 and/or used by the processor 208 to display the results on an output device for the user 202a.

Figure 3A:
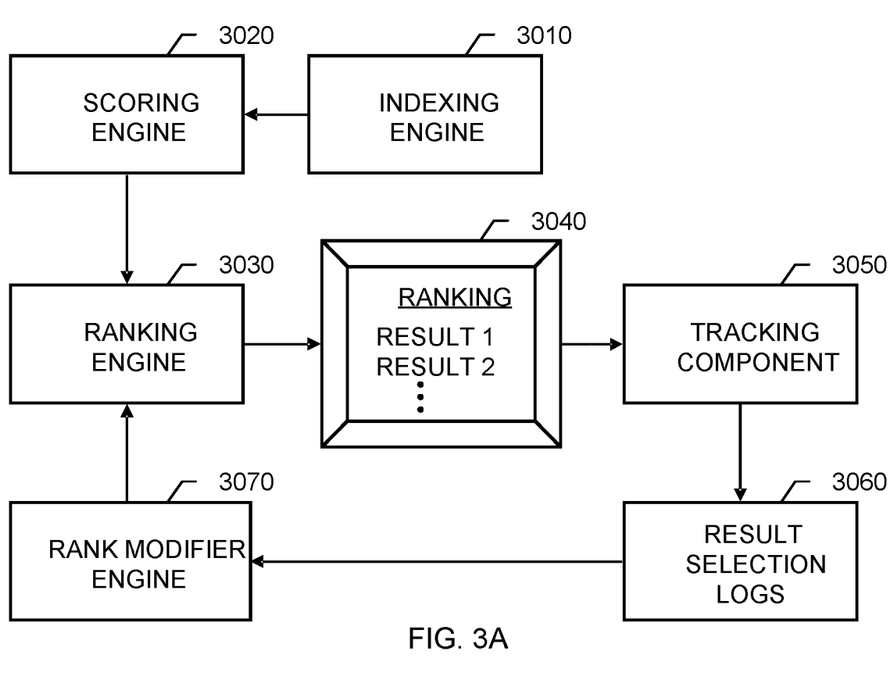
FIG. 3A illustrates example components of an information retrieval system.

FIG. 3A illustrates example components of an information retrieval system. These components include an indexing engine 3010, a scoring engine 3020, a ranking engine 3040, and a rank modifier engine 3070. The indexing engine 3010 functions as described above for the indexing engine 220. The scoring engine 3020 generates scores for document results based on many different features, including content-based features that link a query to document results, and query-independent features that generally indicate the quality of documents results. Content based features for images include, for example, aspects of the document that contains the image, such as query matches to the document's title or the image's caption. The query-independent features include, for example, aspects of document cross-referencing of the document or the domain, or image dimensions. Moreover, the particular functions used by the scoring engine 3020 can be tuned, to adjust the various feature contributions to the final IR score, using automatic or semi-automatic processes.

The ranking engine 3040 produces a ranking of document results 3040 for display to a user based on IR scores received from the scoring engine 3020 and one or more signals from the rank modifier engine 3070. The rank modifier engine 3070 provides one or more measures of relevance for the documents, which can be used by the ranking engine 3040 to improve the search results' ranking provided to the user. A tracking component 3050 is used to record information regarding user behavior such as individual user selections of the results presented in the ranking 3040. In some implementations, the tracking component 3050 is embedded JavaScript code included in a web page ranking 3040 that identifies user selections of individual document results and also identifies when the user returns to the results page, thus indicating the amount of time the user spent viewing the selected document result. In other implementations, the tracking component 3050 is a proxy system through which user selections of the document results are routed. The tracking component can also include pre-installed software at the client (e.g., a toolbar plug-in to the client's operating system). Other implementations are also possible, for example, an implementation that uses a feature of a web browser that allows a tag/directive to be included in a page, which requests the browser to connect back to the server with message(s) regarding link(s) clicked by the user.

The recorded information is stored in result selection logs 3060. In various implementations, the recorded information includes log entries that indicate user interaction with each result document presented for each query submitted. For each user selection of a result document presented for a query, the log entries indicate the query (Q), the document (D), the user's dwell time (T) on the document, the language (L) employed by the user, and the country (C) where the user is likely located (e.g., based on the server used to access the IR system) and a region code (R) identifying the metropolitan area of the user. The log entries also records negative information, such as the fact that a document result was presented to a user, but was not selected. Other information such as position(s) of click(s) (i.e., user selection(s)) in the user interface, information about the session (e.g., existence and type of previous clicks, and post-click session activity), IR scores of clicked results, IR scores of all results shown before click, the titles and snippets shown to the user before the click, the user's cookie, cookie age, IP (Internet Protocol) address, user agent of the browser, and so on, can also be recorded.

In various implementations, the time (T) between the initial click-through to the document result and the user's returning to the main page and clicking on another document result (or submitting a new search query) is also recorded. An assessment is made about the time (T) regarding whether this time indicates a longer view of the document result or a shorter view of the document result, since longer views are generally indicative of quality or relevance for the clicked through result. This assessment about the time (T) can further be made in conjunction with various weighting techniques.

The components shown in FIG. 3A can be combined in various manners and implemented in various system configurations. For example, the scoring engine 3020 and the ranking engine 3040 can be merged into a single ranking engine, such as the ranking engine 352 of FIG. 3. The rank modifier engine 3070 and the ranking engine 3040 can also be merged, and in general, a ranking engine includes any software component that generates a ranking of document results after a query. Moreover, a ranking engine can be included in a client system in addition to (or rather than) in a server system.

Figure 3B:
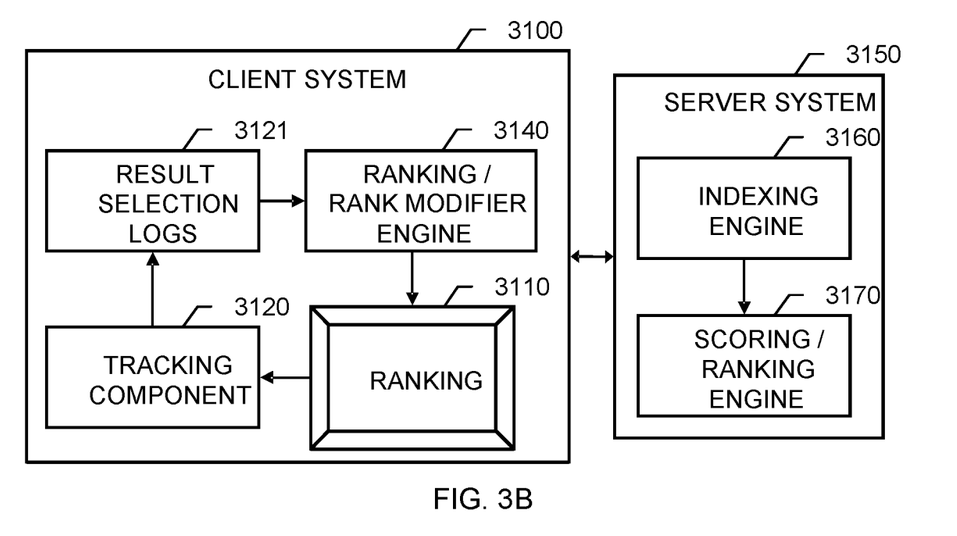
FIG. 3B illustrates another example information retrieval system.

FIG. 3B illustrates another example information retrieval system. In this system, a server system 3150 includes an indexing engine 3160 and a scoring/ranking engine 3170. A client system 3100 includes a user interface 3110 for presenting a ranking, a tracking component 3120, result selection logs 3121 and a ranking/rank modifier engine 3140. For example, the client system 3100 can include a company's enterprise network and personal computers, in which a browser plug-in incorporates the ranking/rank modifier engine 3140. When an employee in the company initiates a search on the server system 3150, the scoring/ranking engine 3170 can return the search results along with either an initial ranking or the actual IR scores for the results. The browser plug-in then re-ranks the results locally based on tracked page selections for the company-specific user base.

Figure 4:
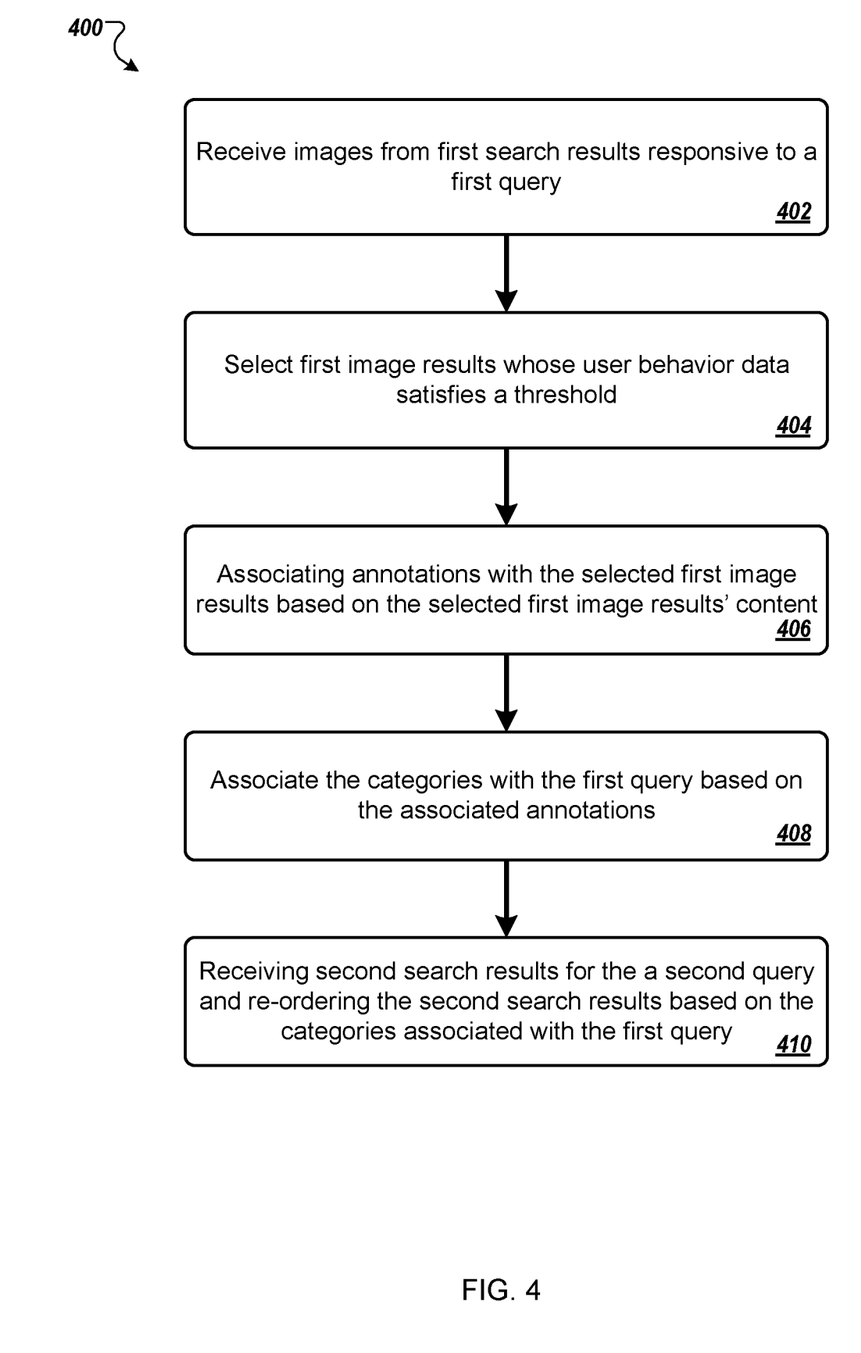
FIG. 4 is a flow chart of an example technique for categorizing queries.

FIG. 4 is a flow chart of an example technique 400 for categorizing queries. This technique can be performed in an on-line fashion (as part of query processing), or in an off-line fashion. First image results responsive to a first query are received (step 402). Each of the first images is associated with an order (e.g., an IR score) and a respective user behavior data (e.g., click data). A plurality of the first images are selected where a metric for the respective behavior data for each selected image satisfies a threshold (step 404). The selected first images are associated with a plurality of annotations based on analysis of the selected first images' content (step 406; see, e.g., FIG. 1B and accompanying discussion). The image annotations can be persisted in image annotations 120, for example. One or more categories are then associated with the first query based on the annotations (step 408; see, e.g., FIG. 1B and accompanying discussion). The query category associations can be persisted in query categories 116. Second image results responsive to a second query that is the same or similar to the first query are then received. (If the second query is not found in the query categories 116, the second query can be transformed or "rewritten" to determine if an alternate form of the query matches a query in the query categories 116.) In this example, the second query is the same as, or is able to be rewritten as, the first query. The second image results are re-ordered based on the categories previously associated with the first query (step 410).

Figure 5:
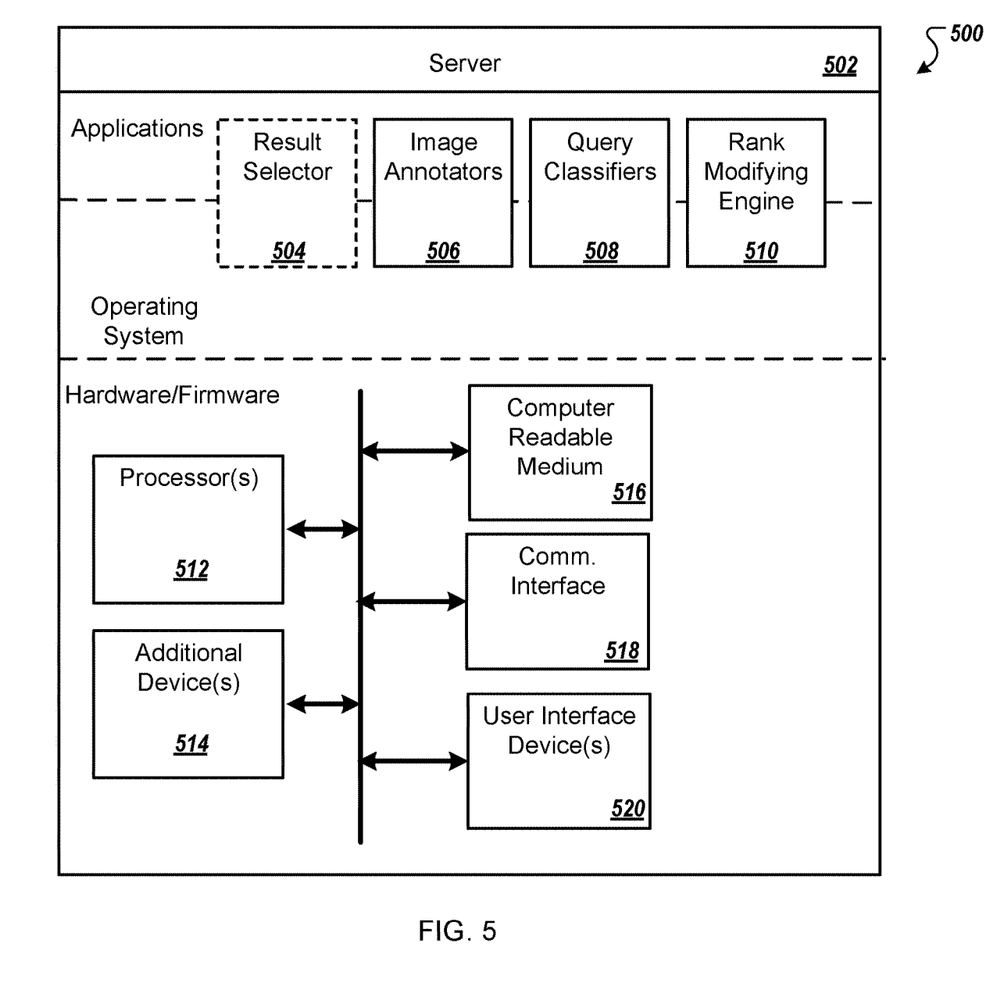
FIG. 5 illustrates an architecture of an example system.

FIG. 5 illustrates an architecture of an example system 500. The system generally consists of a server 502. The server 502 is optionally connected to one or more user computers through a network. The server 502 consists of one or more data processing apparatus. While only one data processing apparatus is shown in FIG. 5, multiple data processing apparatus can be used. The server 502 includes various modules, e.g. executable software programs, including an optional result selector 504, image annotators 506 which determine annotations for images, query classifiers 508 which use image annotations to determine categories for the given query, and a rank modifying engine 510. Each module runs as part of the operating system on the server 502, runs as an application on the server 502, or runs as part of the operating system and part of an application on the server 502, for instance.

The server 502 can also include hardware or firmware devices including one or more processors 512, one or more additional devices 514, computer readable medium 516, a communication interface 518, and one or more user interface devices 520. Each processor 508 is capable of processing instructions for execution within the server 502. In some implementations, the processor 508 is a single or multi-threaded processor. Each processor 508 is capable of processing instructions stored on the computer readable medium 516 or on a storage device such as one of the additional devices 514. The server 502 uses its communication interface 518 to communicate with one or more computers, for example, over a network. Examples of user interface devices 520 include a display, a camera, a speaker, a microphone, a tactile feedback device, a keyboard, and a mouse.

The server 502 can store instructions that implement operations associated with the modules described above, for example, on the computer readable medium 516 or one or more additional devices 514, for example, one or more of a floppy disk device, a hard disk device, an optical disk device, or a tape device. In some implementations, the server 502 also stores additional data, for example, the query-category associations table 118.

The systems 100, 200 and 500 are example data processing apparatus in which the systems, components and techniques described herein can be implemented. Although several software components are illustrated in each system, there may be fewer or more software components. Moreover, the software components can be distributed on one or more computing devices connected by one or more networks or other suitable communication mediums.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computing system comprising:
   one or more processors;
   one or more non-transitory computer readable media that collectively store instructions that, when executed by the one or more processors, cause the computing system to perform operations, the operations comprising:
      receiving a search query;
      determining, by processing the search query with a search engine, a plurality of images associated with a set of image results, wherein the set of image results are responsive to the search query;
      determining, by a ranking engine, a ranking of the set of image results based on the search query;
      processing the search query with a query classifier to determine a query classification, wherein the query classification is descriptive of one or more probabilities of the search query calling for images of one or more particular categories, wherein at least one of the one or more particular categories specifies a presence of a particular visual feature to be included in a search result, wherein the query classifier was trained to determine a probability that a query requests images associated with a respective category, wherein the query classifier was trained on a training dataset comprising: example queries and categorizations for each of the example queries;
      processing the set of image results with a categorizer engine to determine one or more particular image results of the set of image results are associated with the one or more particular categories; and
      increasing, via a rank modifier engine of the search engine, the ranking of the one or more particular image results based on the one or more particular image results having an association with the one or more particular categories of the search query.

2. The computing system of claim 1, wherein the training dataset further comprises: sets of feature vectors representing result images for the example queries.

3. The computing system of claim 1, wherein the operations further comprise:
   receiving a second query, wherein the second query comprises a second set of text characters; and
   determining the second query is associated with the search query.

4. The computing system of claim 3, wherein determining the second query is associated with the search query comprises:
   determining that the second query can be transformed into an alternative form that is same or similar to the search query.

5. The computing system of claim 4, wherein the operations further comprise:
   determining, by processing the second query with the search engine, a second set of image results;
   processing the second set of image results with the categorizer engine to determine one or more second particular image results of the second set of image results are associated with the one or more particular categories by:
      categorizing, by the categorizer engine, the one or more second particular image results of the second set of image results into the one or more particular categories associated with the search query; and
   modifying rankings of the second set of image results based on increasing rankings of the one or more second particular image results of the second set of image results based on the one or more particular categories.

6. The computing system of claim 1, wherein obtaining the plurality of images associated with the set of image results comprises determining an ordered list of documents based on the search query.

7. The computing system of claim 6, wherein the first set of image results comprise documents determined to have a high rank based on the first query.

8. The computing system of claim 6, wherein the ordered list of documents is based at least in part on click data associated with the first set of image results.

9. The computing system of claim 1, wherein the operations further comprise:
   decreasing, via the search engine, the ranking of one or more other image results based on the one or more particular categories of the search query.

10. The computing system of claim 1, wherein the operations further comprise: determining whether the one or more particular image results comprise a screenshot.

11. A computer-implemented method, the method comprising:
    receiving, by a computing system comprising one or more processors, a search query;
    determining, by the computing system and based on processing the search query with a search engine, a plurality of images associated with a set of image results, wherein the set of image results are responsive to the search query;
    determining, by a ranking engine, a ranking of the set of image results based on the search query;
    processing, by the computing system, the search query with a query classifier to determine a query classification, wherein the query classification is descriptive of one or more probabilities of the search query calling for images of one or more particular categories, wherein at least one of the one or more particular categories specifies a presence of a particular visual feature to be included in a search result, wherein the query classifier was trained to determine a probability that a query requests images associated with a respective category, wherein the query classifier was trained on a training dataset comprising: example queries and categorizations for each of the example queries;

processing the set of image results with a categorizer engine to determine, by the computing system, one or more particular image results of the set of image results are associated with the one or more particular categories; and increasing, by the computing system and via the search engine, a ranking of the one or more particular image results based on the one or more particular image results having an association with the one or more particular categories of the first query.

12. The method of claim 11, wherein the one or more images of the plurality of images are selected based on a ranking of the set of image results, wherein the ranking is based on one or more past user selections.

13. The method of claim 11, wherein the one or more particular categories are associated with a number of faces depicted.

14. The method of claim 11, wherein processing, by the computing system, the search query with the query classifier to determine the query classification comprises:

generating, by the computing system, a set of fingerprints associated with the set of image results;

clustering, by the computing system and via an image cluster identifier, the set of image results into one or more clusters based on a measure of distance between respective fingerprints of the set of fingerprints associated with the set of image results; and determining, by the computing system, the query classification based on the one or more clusters.

15. The method of claim 14, wherein the query classification is descriptive of a specific topic, wherein the query classification is determined based on a number of clusters.

16. The method of claim 14, wherein processing, by the computing system, the search query with the query classifier to determine the query classification further comprises:

associating, by the computing system, the search query with a canonical meaning based on the one or more clusters.

17. One or more non-transitory computer-readable media that collectively store instructions that, when executed by one or more computing devices comprising one or more processors, cause the one or more computing devices to perform operations, the operations comprising:

receiving a search query via a user interface;

determining, by processing the search query with a search engine associated with the user interface, a plurality of images associated with a set of image results, wherein the set of image results are responsive to the search query;

determining, by a ranking engine, a ranking of the set of image results based on the search query;

processing the search query with a query classifier to determine a query classification, wherein the query classification is descriptive of one or more probabilities of the search query calling for images of one or more particular categories, wherein at least one of the one or more particular categories specifies a presence of a particular visual feature to be included in a search result, wherein the query classifier was trained to determine a probability that a query requests images associated with a respective category, wherein the query classifier comprises a machine learning system that was trained on a training dataset comprising: example queries, a set of feature vectors representing result images for the example queries, and categorizations for each of the example queries;

processing the set of image results with a categorizer engine to determine, via a result selector of the search engine, one or more particular image results of the set of image results are associated with the one or more particular categories;

increasing, via a rank modifier engine of the search engine, a ranking of the one or more particular image results based on the one or more particular image results having an association with the one or more particular categories of the first query; and providing, via the user interface, a search results web page for display with a positioning of the one or more particular image results being determined based on the ranking.

18. The one or more non-transitory computer-readable media of claim 17, wherein determining the one or more particular image results of the set of image results are associated with the one or more particular categories comprises:

determining how many faces are in each of the plurality of images.

19. The one or more non-transitory computer-readable media of claim 17, wherein the operations further comprise:

determining a plurality of fingerprints for the plurality of images; and determining whether a subset of images of the plurality of images are similar based on the plurality of fingerprints.

20. The one or more non-transitory computer-readable media of claim 17, wherein the query classifier was generated via adaptive boosting, wherein invokes an image annotator for training.

* * * * *